US005757904A

United States Patent [19]
Anderson

[11] Patent Number: 5,757,904
[45] Date of Patent: May 26, 1998

[54] CONTEXT-SENSITIVE PRESENTATION OF INFORMATION TO CALL-CENTER AGENTS

[75] Inventor: Gregory Lane Anderson, Dallas, Tex.

[73] Assignee: Lucent Technologies Inc., Murray Hill, N.J.

[21] Appl. No.: 597,056

[22] Filed: Feb. 5, 1996

[51] Int. Cl.$^6$ .................. H04Q 3/64; H04M 3/22; H04M 3/50; H04M 3/00

[52] U.S. Cl. .................. 379/265; 345/338; 379/34; 379/214; 379/309

[58] Field of Search ........................ 379/34, 38, 201, 379/207, 265, 266, 309, 214; 345/338

[56] References Cited

U.S. PATENT DOCUMENTS

| | | | |
|---|---|---|---|
| 4,692,817 | 9/1987 | Theis | 360/12 |
| 5,101,425 | 3/1992 | Darland et al. | 379/265 X |
| 5,434,906 | 7/1995 | Robinson et al. | 379/67 |
| 5,493,692 | 2/1996 | Theimer et al. | 379/38 X |
| 5,535,323 | 7/1996 | Miller et al. | 379/338 |
| 5,537,470 | 7/1996 | Lee | 379/266 |
| 5,642,410 | 6/1997 | Walsh et al. | 379/201 |

OTHER PUBLICATIONS

Computer Telephony articles, vol. 2, Issue 7, Jul. 1995, pp. 40, 42, 43.
Computer Telephony article, vol. 3, Issue 8, Aug. 1995, p. 28.
Newton, H., *A Microsoft Fantasy*, Computer Telephony, Jan./Feb. 1994, pp. 10, 12, 15–16.
Computer Telephony article, *Answersoft's Sixth Sense Is Always Watching*, Dec., 1995, p. 26.

*Primary Examiner*—Harry S. Hong
*Attorney, Agent, or Firm*—David Volejnicek

[57] ABSTRACT

A method (200–520) and an apparatus (118) for presenting information to a call center agent in a context-sensitive manner involves monitoring (314, 504) activities—such as keyboard or pointer input from an agent and information being displayed to the agent—at an agent position (140, 150) of a call center, receiving (318, 508) a request for information—such as directory information or a list of wrapup codes—from the agent, in response analyzing (322, 324, 512) the request within the context of the monitored activities to determine a subset of the requested information—such as selected telephone numbers or a selected wrapup code—which is most relevant to the monitored activities, and then either presenting (404, 408)—displaying—only the subset to the agent in response to the request, or presenting (410, 514) the requested information in a manner that emphasizes the subset over the rest of the requested information—such as by highlighting the subset. Preferably, the monitoring also includes monitoring (202) with whom the agent is presently engaged in a telephone call and what the telephone call is about, and the analyzing also includes analyzing (208, 304) the monitored activities to determine whether non-requested information is relevant to the monitored activities or what actions should be undertaken with respect to the call, and then giving an indication (216, 312) of the determination to the agent.

44 Claims, 6 Drawing Sheets

CONTEXT-SENSITIVE PRESENTATION OF INFORMATION TO CALL-CENTER AGENTS

TECHNICAL FIELD

This invention relates generally to call centers, also alternatively known as telecenters or automatic call distribution systems, and relates specifically to computer-integrated telephony, also alternatively known as computer-telephony integration, in call centers.

BACKGROUND OF THE INVENTION

Call centers are systems that enable a group of agents to serve incoming and/or outgoing calls, with the calls being distributed and connected to whichever of the agents happen to be available at the time of the call. Call centers are well known in the art. In most business applications of call centers, such as credit verification, debt collection, sales, service, etc., the agents must have access to a lot of information to serve calls properly. Also, once they are done serving a call, they are required to record a lot of information about the call. Typically, the obtaining and recording of the information is done on-line, via agents' data terminals that are connected to a host computer or a server.

In the last decade or so, computer-telephony integration (CTI) has found wide use in call centers. As it is typically implemented in call centers, CTI conveys telephony information, such as the telephone number of the calling or called person, and the identity of the agent to whom the call is connected, to the host computer, whereupon the host computer uses this information to send relevant information, such as the account file on the calling or called person, to the terminal of the agent to whom the call is connected, without the agent having to even request the information. This has considerably eased the agents' job and speeded up the agents' serving of the calls.

Nevertheless, much of the information-processing still remains up to the agents. For example, even though an agent may automatically receive the account records for the call that the agent is presently serving, it is entirely up to the agent to determine and select for display and/or data entry the particular one or more screens of information from these records that are actually relevant to the present transaction.

If the call must be transferred to another agent, such as a specialist, it is up to the agent to determine what skills the transferee needs, which agents have the requisite skills, and which of those agents are free to receive the call. And at the conclusion of the call, it is up to the agent to manually indicate to the system the agent's work state and any changes in the work state as they occur, and to record any requisite information about the call, e.g., to select and indicate a work or "wrap-up" code for the call. These are just a few examples that illustrate the extensive skills that the agents must have, and hence the extensive training they must undergo, knowledge they must develop, and experience that they must accumulate, in order to do their job effectively.

Providing the agents with on-line access to voluminous additional information may make the agents less dependent upon their memory, and faster in obtaining information that they do not remember. But it does little if anything to make the agents less dependent upon their skills and to make the agents' job easier. Rather, it may even overwhelm the agents with too much information, to the detriment of their performance.

SUMMARY OF THE INVENTION

This invention is directed to solving these and other problems and disadvantages of the prior art. Applicant has realized that a key to making the call center agents' job significantly easier is to provide the agents with information in a context-sensitive manner. "Context-sensitive" for purposes of this application means dependent upon the identity, the history, and the present state, as well as the subject, of a function which the agent is performing at that time. The subject of the function includes the particular call, or the particular calling or called party, with respect to which the function is being performed.

Providing the agents with information in a context-sensitive manner means that the information which is presently most relevant to the function, and hence is of interest to the agent, either is provided alone to the exclusion of presently-less relevant or irrelevant information, or is highlighted or presented in some other manner that emphasizes it over the presently-less relevant or irrelevant information. Information is therefore pre-selected for the agent, and in the pre-selection process some of the skill that the agent would normally apply to selecting information is applied automatically on the agent's behalf in the pre-selection process. Hence, dependency upon the agent's own skill is lessened. Furthermore, as a consequence of the pre-selection, the agent is presented with less information than would otherwise be the case. That means that the agent is not as likely to be overwhelmed by the amount of information being presented, that the agent can use the presented information faster because he or she does not have to sift through so much information, and that the agent is likely to complete the function more accurately because he or she will not be distracted or confused by less-relevant or irrelevant information.

According to an aspect of the invention, therefore, a method and an apparatus for presenting call center information in a context-sensitive manner involves monitoring activities (such as keyboard or pointer input from an agent and information being displayed to the agent, for example) at an agent position of a call center, receiving a request for information (such as directory information or a list of wrapup codes, for example) from the agent position and in response analyzing the request within the context of the monitored activities to determine a subset of the requested information (e.g., telephone numbers or a wrapup code) which is most relevant to the monitored activities and which excludes some of the requested information, and then either presenting (e.g., displaying) only the subset of the requested information at the agent position in response to the request, or presenting the requested information in a manner that emphasizes the subset over the rest of the requested information (e.g., highlighting the subset).

Preferably, the monitoring also includes monitoring with whom the agent at the agent position is presently engaged in a telephone call and what the telephone call is about, and the analyzing also includes analyzing the monitored activities to determine whether non-requested information is relevant to the monitored activities or whether actions or responses should be performed at this point (e.g. whether the call should be transferred), and then giving an indication of the determination to the agent.

Advantageously, the method or apparatus thus exercises a modicum of intelligence on behalf of the agent so as to relieve the agent of some of this burden.

Furthermore, the method and apparatus are applicable in a wide variety of settings, even outside of call centers—for example, in a receptionist setting. According to another aspect of the invention, therefore, a method and an apparatus for presenting directory information to a party to a call in a context-sensitive manner involves determining with whom the party to the call is presently engaged in the call, analyzing contents of a directory that includes a plurality of directory entries to determine a subset of the directory entries which are most relevant to who the agent is presently engaged with and which excludes some of the directory entries, and then presenting the subset of the directory entries to the party to the call. Illustratively, analyzing involves analyzing a previous-call history of who the agent is presently engaged with, to determine the subset of the directory entries—such as the entries of those entities whom the previous-call history identifies as having been parties to the previous calls.

These and other advantages and features of the invention will become more apparent from the following description of an illustrative embodiment of the invention taken together with the drawing.

DETAILED DESCRIPTION

Figure 1:
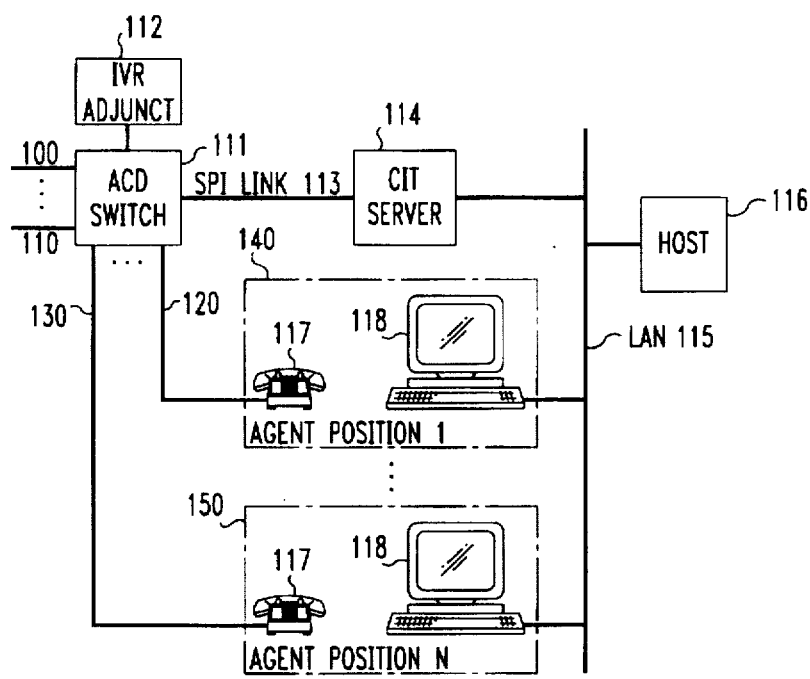
FIG. 1 is a block diagram of an illustrative computer-integrated telephone call center that includes a first illustrative implementation of the invention.

FIG. 1 shows a computer-integrated telephone (CIT) call center. At the level of detail shown in FIG. 1, the CIT call center is conventional. It includes a plurality of agent positions 140–150. Each agent position 140–150 is designed to be staffed by one agent and provides terminal equipment by means of which the agent serves calls. The terminal equipment includes a call-center telephone 117 and a data workstation 118. Preferably, telephones 117 are integrated into workstations 118 such that the agents only have handsets or headsets connected to workstations 118 and exercise all telephony commands and control by pointing and clicking the workstation cursor on an image of a telephone that is displayed on the display screen of workstation 118. Such "soft phones" implemented by intelligent workstations are known in the art. The call center telephones 117 are connected by telephone lines 120–130 to an ACD switch 111, such as an AT&T Definity® ACD private branch exchange, which distributes incoming and/or outgoing calls to agent positions that are presently free to handle calls. ACD switch 111 is in turn connected by telephone trunks 100–110 to the public telephone network. For automated processing of calls, playout of pre-recorded information to calls, and/or recording of calling or called party responses or messages, ACD switch 111 is equipped with an interactive voice-response (IVR) adjunct 112, such as an AT&T Conversant® system. Workstations 118 of agent positions 140–150 are interconnected by a local area network (LAN) 115. LAN 115 connects workstations 118 to a host 116, which is typically a database computer that contains information relevant to the call center's functions, such as data records on actual and/or prospective calling and/or called parties. Also connected to LAN 115 is a CIT server 114 which obtains telephony information, such as the telephone number of the calling or called parties, and the agent positions to which calls with those parties are connected, from ACD switch 111 via a service-provider interface (SPI) data link 113 and provides this information to host 116 and perhaps also to terminals 118. CIT server 114 also sends commands to ACD switch 111 at the behest of host 116 and/or workstations 118. In the case of ACD switch 111 being the AT&T Definity system, SPI data link is preferably the AT&T ASAI data link. CIT server 114 is generally implemented via software on a general-purpose programmable platform such as a personal computer or a workstation.

According to the invention, the role of workstations 118 is expanded to provide information to agents that is a function of the context in which the information is being applied. Since workstations 118 are stored-program-controlled computers that have a memory for storing control programs and a processor for executing the control programs out of the memory, the expansion is preferably effected easily by reprogramming workstations 118 with new control programs that implement the requisite functionality.

Of course, the specific items of information that constitute context and hence need to be considered by workstations 118, the context-relevant information that is made accessible through CIT server 114 by the ACD switch 111, the information provided by host 116, and the processing of that information in light of (i.e., as a function of) the context, are all directly tied to the particular design of the call center, the specific types, models, and manufacturers of the call center's components, the industry which the call center is serving, the application of the call center within that industry, the data contents of the host, the individual desires of the customer or customers that the call center serves, the pre-determined treatment for groups of callers or individual callers, the timing or circumstance of groups of callers or individual callers, etc. Hence, they cannot be exhaustively described. Rather, they can only be illustrated by specific examples. Consequently, the specific examples that are presented below must be read with the understanding that they are merely illustrative, and by no means exhaustive, of the generic invention. The invention is first illustrated below within the context of an airline reservations call center scenario.

Assume that Mr. Allen is scheduled to fly today from Dallas to Paris on a flight departing at 9:00 A.M. from Dallas-Fort Worth airport. There is a change of airplanes in New York with a layover before Mr. Allen continues to Paris. Mr. Brown, a business associate, will be joining Mr. Allen for the flight from Dallas. Another business associate, Mr. Casey, will be flying from Chicago and joining Mr. Allen and Mr. Brown in New York for the flight to Paris. The flight from Chicago that Mr. Casey is on arrives in New York 30 minutes before the flight from Dallas, so Mr. Casey will be meeting his associates from Dallas at their arriving gate in New York. All of their airline reservations were made at the same time by Mr. Allen's secretary, by calling the airline reservations call center and speaking with agent Doe.

It is now 7:45 A.M. Dallas time, and Mr. Allen is driving to the DFW airport when he gets a flat tire. Knowing that he will not be able to make the 9:00 A.M. departure, he is concerned about changing his schedule as well as coordinating with Mr. Brown and Mr. Casey. He goes to a payphone and calls the airline reservations call center.

Figure 2:
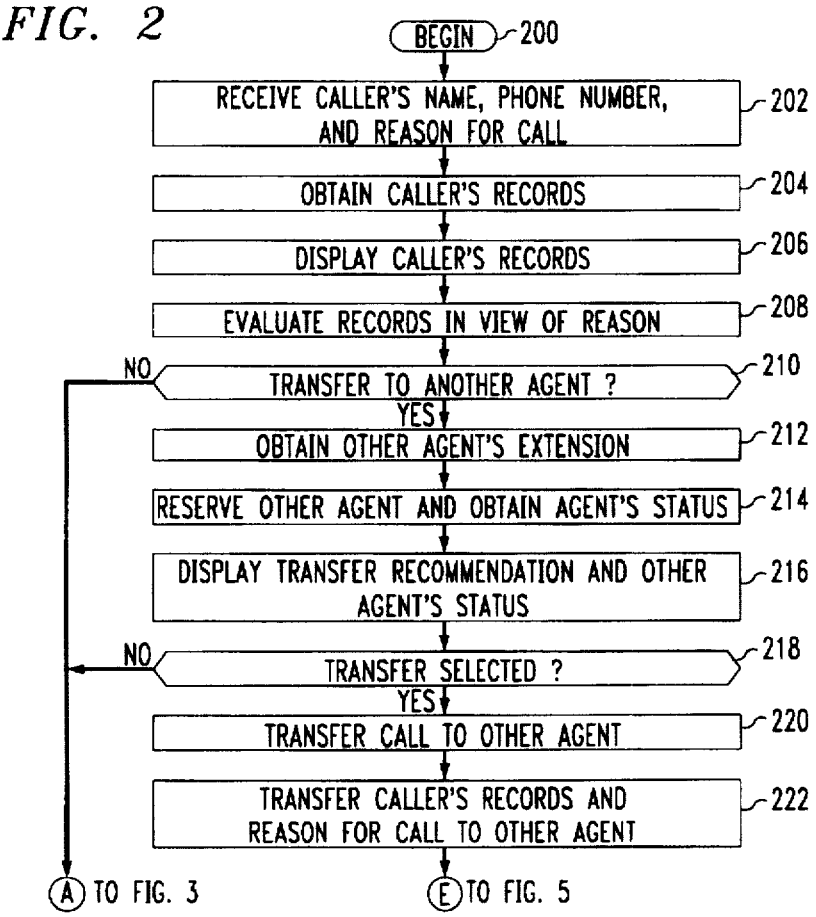
FIGS. 2–5 are a functional flow diagram of the operations of one or more workstations of the call center of FIG. 1 in handling a transaction with a customer.

The call center routes his call to agent Eng, and the transaction begins, at step 200 of FIG. 2. When agent Eng answers the call, Mr. Allen gives his name and explains that he is a customer needing to make changes to his reservations.

Agent Eng types this information into workstation 118, asks Mr. Allen for his home telephone number, and also types it into workstation 118, at step 202.

Figure 5:
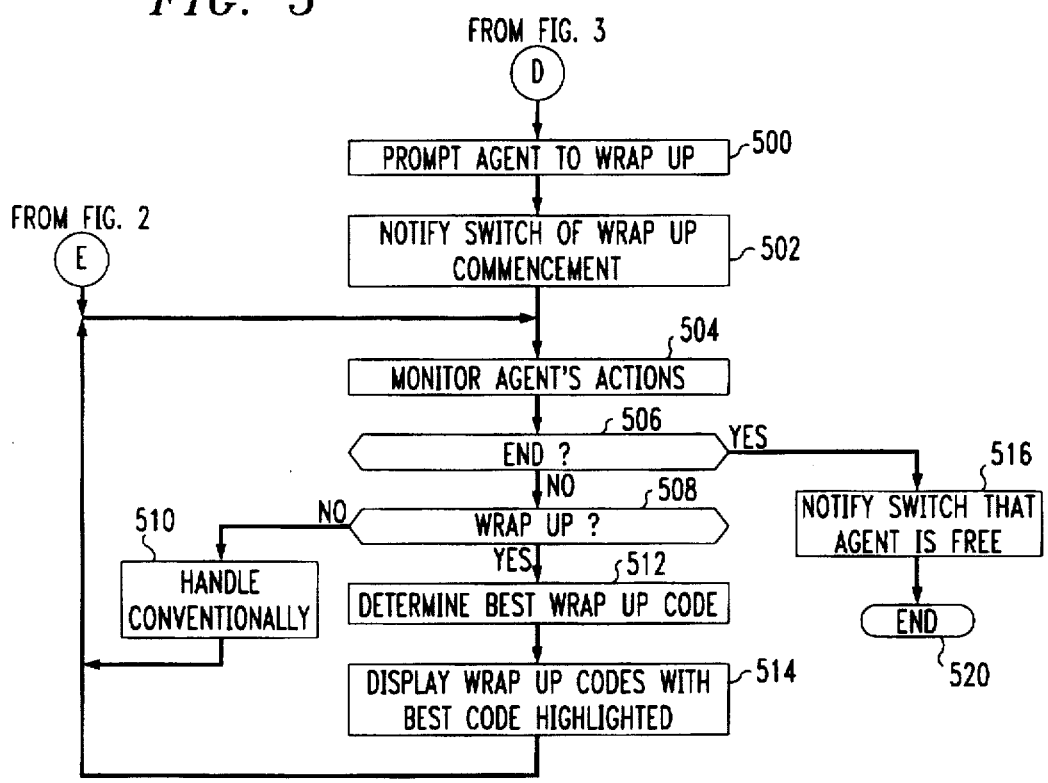

Workstation 118 sends a request to host 116 for any records for this name and number, at step 204. Host 116 returns at least the records that were made when Mr. Allen's secretary made the reservations. Workstation 118 displays the received records to agent Eng, at step 206, and—knowing from step 202 that Mr. Allen needs to make changes to existing reservations—evaluates the record, at step 208, to determine if agent Eng made the original reservations, and if not, whether the call would be better handled by the agent who did make the original reservations, at step 210. If it determines that the call should not be transferred, processing continues at step 304 of FIG. 3. However, upon finding an indication that a plurality of reservations were made jointly with this reservation by agent Doe, workstation 118 determines that the call would be better handled by agent Doe who made all of the reservations. Workstation 118 therefore either looks up agent Doe's extension number in its internal database or requests it from host 116 or CIT server 114, at step 212, and sends a message to CIT server 114 to cause ACD switch 111 to reserve agent Doe for a few seconds and to find out whether agent Doe is free, at step 214. Workstation 118 then displays a message recommending that the call be transferred to agent Doe, and agent Doe's status, at step 216. Workstation 118 then waits a few seconds for agent Eng's decision. If agent Eng decides not to follow the advice, as determined at step 218, processing continues at step 304 of FIG. 3. If agent Eng presses the TRANSFER key, workstation 118 sends a message to CIT server 114 to cause ACD switch 111 to either transfer the call to agent Doe's extension number if agent Doe is not busy, or to queue the call for agent Doe if agent Doe is presently busy, at step 220, and also sends the database records that it obtained at step 204 to agent Doe's workstation 118 with an indication that this is a transferred call on which reservation changes are required, at step 222. (Alternatively, workstation 118 may not even suggest the transfer if it finds that agent Doe is presently busy.) Agent Eng's workstation then proceeds to step 504 of FIG. 5 to wrap up the call.

Figure 3:
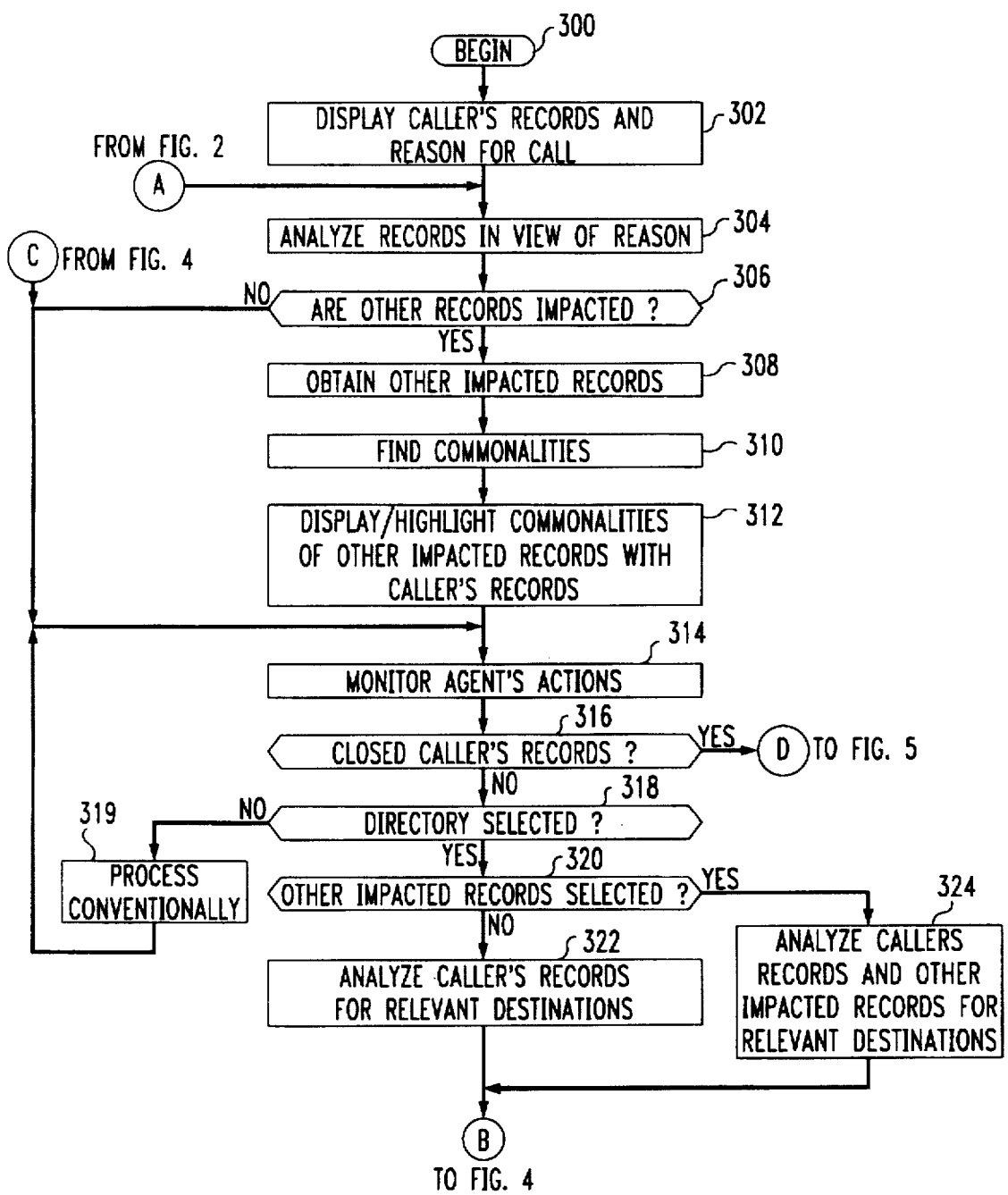

When agent Doe's workstation 118 receives the call, it displays the information about the call that it received at step 222 to agent Doe, at step 302 of FIG. 3, so that agent Doe can answer the call with "Yes, Mr. Allen, what reservation changes do you need?" and then proceeds to step 304. Step 304 is also where processing of the call continues if the call remains with agent Eng's workstation 118. At step 304, workstation 118 examines Mr. Allen's records to determine if other records are impacted, at step 306. This may be done either automatically or in response to a request from agent Doe. Upon finding the indication that a plurality of reservations were made jointly with this reservation, it obtains records of these reservations from host 116, at step 308, and examines them for commonality with Mr. Allen's reservations, at step 310. Upon finding commonality—Messrs. Allen, Brown, and Casey are arriving in New York at substantially the same time, not to mention taking the same flight from New York to Paris—workstation 118 displays an indication thereof—such as a window with excerpts from Mr. Brown's and Mr. Casey's records with the commonalities highlighted—at step 312. Following step 312, or if no other records were determined to be impacted at step 306, workstation 118 proceeds to monitor its agent's keyboard and pointer inputs. In the meantime, Mr. Allen asks if there is a later flight out of Dallas that will get him to New York in time. Agent Doe looks this information up in the conventional manner, at step 320, and confirms that there is a 10:00 A.M. flight from Dallas to New York with available seats. Agent Doe asks whether Mr. Allen wishes to take this flight, and when he answers affirmatively, agent Doe remarks that she can see that Mr. Allen is traveling with Mr. Brown, and would he like to change Mr. Brown's reservations as well. Depending on Mr. Allen's answers, agent Doe changes only Mr. Allen's, or both Mr. Allen's and Mr. Brown's, reservations accordingly, at step 320. Agent Doe then asks Mr. Allen if he would like assistance in coordinating with Messrs. Brown and Casey. If Mr. Allen answers affirmatively, agent Doe points the cursor of workstation 118 at the displayed window of Messr. Brown's and Casey's records and selects DIRECTORY from a command menu. Workstation 118 determines that these actions were taken, at steps 318 and 320. In response, workstation 118 proceeds to determine what directory entries are most relevant to (a) the customer or customers involved in the call and (b) the transaction being executed. Workstation 118 therefore examines the Allen, Brown, and Casey records for relevant call destinations, at step 324. These include Messrs. Allen's, Brown's and Casey's homes and offices and their former and new departure and arrival gates. Other relevant telephone numbers are numbers of previous agents that Mr. Allen has spoken to (agent Eng), of the New York and Paris Customs departments, and telephone numbers of other call center agents and supervisors skilled in international travel reservations and in French. In transactions involving hotel and transportation reservations, relevant numbers also include telephone numbers of the hotel and the car rental agency or limousine service.

If the agent had not pointed at the window of Messrs. Brown's and Casey's records to indicate their selection, at step 320, workstation 118 would have examined only Mr. Allen's records for relevant call destinations, at step 322.

Alternatively, step 320 need not be performed, and workstation 118 may automatically perform step 324 as a consequence of an affirmative determination at step 306.

Figure 4:
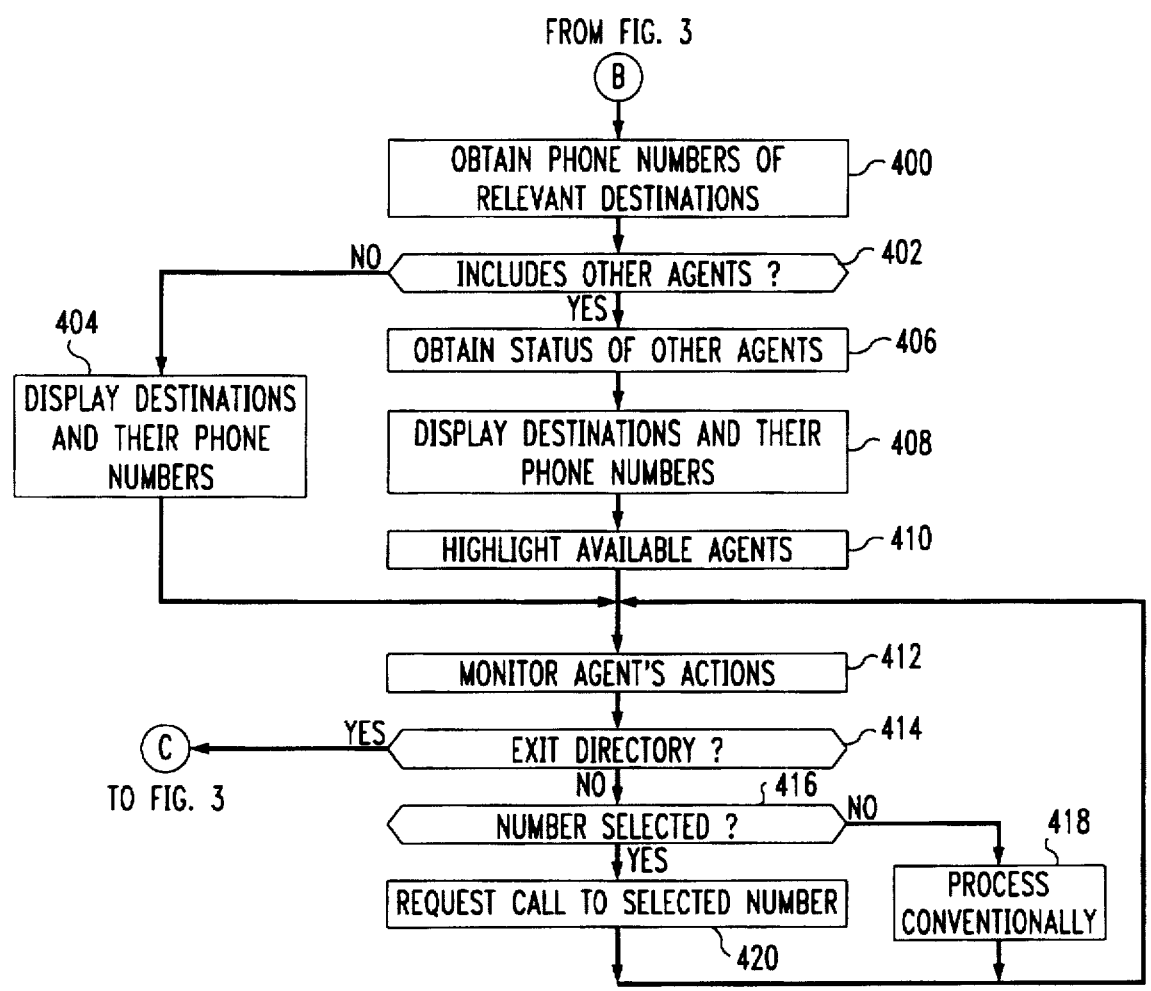

Following step 322 or 324, workstation 118 obtains the telephone numbers of the relevant call destinations from host 116 or CIT server 114, at step 400 of FIG. 4. Workstation 118 checks whether any of them are extensions of other call center agents, at step 402. If not, workstation 118 displays the relevant call destinations and telephone numbers, at step 404. If some relevant telephone numbers are call center agents' extensions, workstation 118 obtains the status of those agents—whether they are logged in and whether they are busy on other calls—from CIT server 114, at step 406. Workstation 118 then displays the call destinations and their telephone numbers, at step 408, and highlights those agents who are available (logged in and not busy), at step 410. Following step 404 or 410, workstation 118 resumes monitoring agent Doe's input into workstation 118, at step 412. If an input action is not a selection of one of the displayed numbers, as determined at step 416, workstation processes the action conventionally, at step 418, and then resumes monitoring at step 412. By selecting a displayed number via the cursor of workstation 118, agent Doe causes workstation 118 to automatically send a message to CIT server 114, to cause ACD switch 111 to put Mr. Allen's call on hold and place a call from agent Doe to the indicated number, at step 420.

Workstation 118 then resumes monitoring, at step 412. Agent Doe selects the telephone number of the 9:00 A.M. flight departure gate in Dallas, talks with the gate agent, and ensures that Mr. Brown will be told that Mr. Allen is delayed, that reservations have been changed, and to go to the gate for the 10:00 A.M. flight and wait there for Mr. Allen. Agent Doe then selects the telephone number of Mr. Casey's Chicago departure gate, and—per Mr. Allen's instructions—leaves a message for Mr. Casey to wait for Messrs. Allen and Brown at the New York airport club. Agent Doe also selects the telephone number of Mr. Casey's New York arrival gate, and leaves the same message there. Being done with the directory, agent Doe exits the directory, at step 414, and in response workstation 118 returns to monitoring the agent's inputs, at step 314 of FIG. 3.

Upon determining from talking to Mr. Allen that there is nothing else he requires, agent Doe closes Mr. Allen's record. But, by practice, the call center always wants to wrap up any call that involves a change in reservations by having the agent go over the changes with the customer one last time. Workstation 118 therefore responds to the closing of Mr. Allen's record, at step 316, by displaying a message that prompts agent Doe to do the wrap up, at step 500 of FIG. 5, and also sends a message to CIT server 114 informing it that agent Doe is commencing wrap up, at step 502. CIT server 114 forwards this information to ACD switch 111. ACD switch 111 knows, from prior calls, the average time that an agent spends in wrapup, and takes the anticipated availability of agent Doe at that time into consideration in computing anticipated waiting time of enqueued calls. Alternatively, this computation is performed by CIT server 114 and its results are forwarded to ACD switch 111. The transaction with Mr. Allen is now finished, and agent Doe hangs up the call.

The end-of-call processing is the same for workstations 118 of both agent Doe and agent Eng. Workstation 118 monitors its agent's inputs, at step 504, and handles most of them conventionally, at step 510. Upon completion of a call—whether by transfer, hangup, or some other manner—agents are required to enter a wrap up code that classifies the call into one of a plurality of categories. In response to its agent's selection of wrap up, at step 508, workstation 118 evaluates the events that it has detected for this call, and determines which wrapup category best fits the call, at step 510. For example, workstation 118 of agent Eng would select a "call transferred" wrapup code, while workstation 118 of agent Doe would select a "change of reservations" wrapup code. Workstation 118 then displays all of the wrapup codes to its agent and highlights the wrap-up code that it selected at step 512 as the suggested wrap-up code for the call, at step 514. Workstation 118 then returns to step 504 to monitor its agent's input. The agent can either accept the suggestion or reject it by entering another code, and workstation 118 processes the agent's selection, at step 510. When the agent is finished, the agent closes the transaction. Upon detecting this, at step 506, workstation 118 sends a message to CIT server 114 to notify ACD switch 111 that the agent has become free to accept a new call, at step 516. Processing of the transaction then ends, at step 520.

Figure 6:
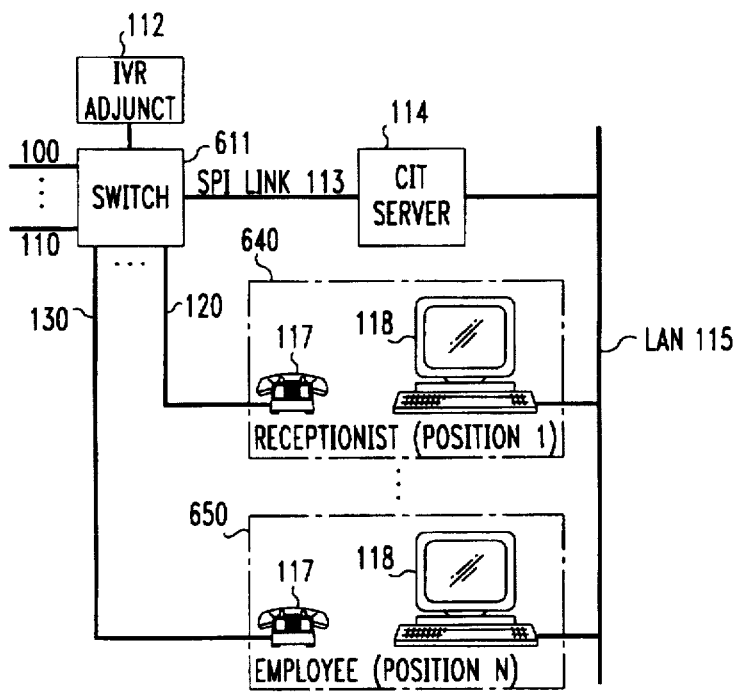
FIG. 6 is a block diagram of an illustrative computer-integrated telephone system that includes a second illustrative implementation of the invention.

A second illustrative embodiment of the invention is presented in FIG. 6 et seq. FIG. 6 shows a CIT private telephone system, such as may be found in a corporation, for example. The system of FIG. 6 is very similar to the call center of FIG. 1. The common elements of these two figures bear common numerical designations. The system of FIG. 6 is not an ACD call center, so ACD switch 111 of FIG. 1 is replaced in FIG. 6 by a conventional private branch exchange (PBX) switch 611, such as the AT&T Definity PBX, and agent positions 140–150 of FIG. 1 are redesignated in FIG. 6 as employee positions 640–650, one of which is a receptionist's position 640.

All incoming calls to the system of FIG. 6 are funneled by switch 611 to telephone 117 of receptionist's position 640. The receptionist answers the calls by saying, for example, "ABC Company, how may I direct your call?" The receptionist uses a context-sensitive directory provided by intelligent workstation 118 for transferring calls to their destinations among employee positions 640–650.

Assume that a first-time caller to ABC Company, Mr. First, has just called and been connected to the receptionist. In response to the call, at step 700, switch 611 obtains the caller's phone number via conventional automatic number identification (ANI) and provides it to CIT server 114, at step 702. In response, CIT server 114 searches its database for a call record for that caller, at step 704. A call record indicates that caller's previous-call history. Upon finding none—because this is a first time caller—as determined at step 706, CIT server 114 creates a record for this new caller, at step 708.

Figure 8:
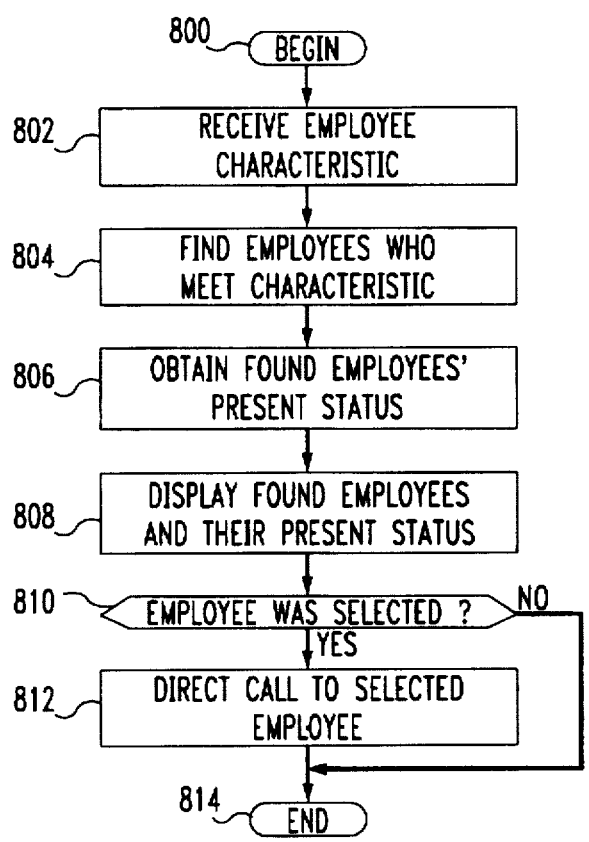

Assume further that when the receptionist answers Mr. First's call, Mr. First asks to speak to a particular employee, Sheila Drinnon. In response, the receptionist types in one or more letters of the employee's name on workstation 118. For example, the receptionist simply presses the letter "D" on workstation 118. This action invokes the directory function, at step 800 of FIG. 8. Workstation 118 responds by receiving the receptionist's input—the letter or letters of the desired employee's name—at step 802, and searches an employee database for employees who match the receptionist's input, at step 804. For example, if the receptionist merely typed in the letter "D", workstation 118 searches for all employees whose last name begins with the letter "D". Workstation 118 then obtains from CIT server 114 the present status—present (logged in) or absent (not logged in), and busy or not busy—of the employees selected at step 804, at step 806, and displays the names and present status of those employees to the receptionist, at step 808. Workstation 118 then awaits the receptionist's selection of one of the employees, at step 810. If it receives a selection of one of the employees, workstation 118 automatically requests CIT server 114 to cause switch 611 to transfer the call from receptionist's position 640 to the telephone of the selected employee, at step 812. Following step 812, or if no selection is received at step 810, workstation 118 ends the directory function, at step 814.

Figure 7:
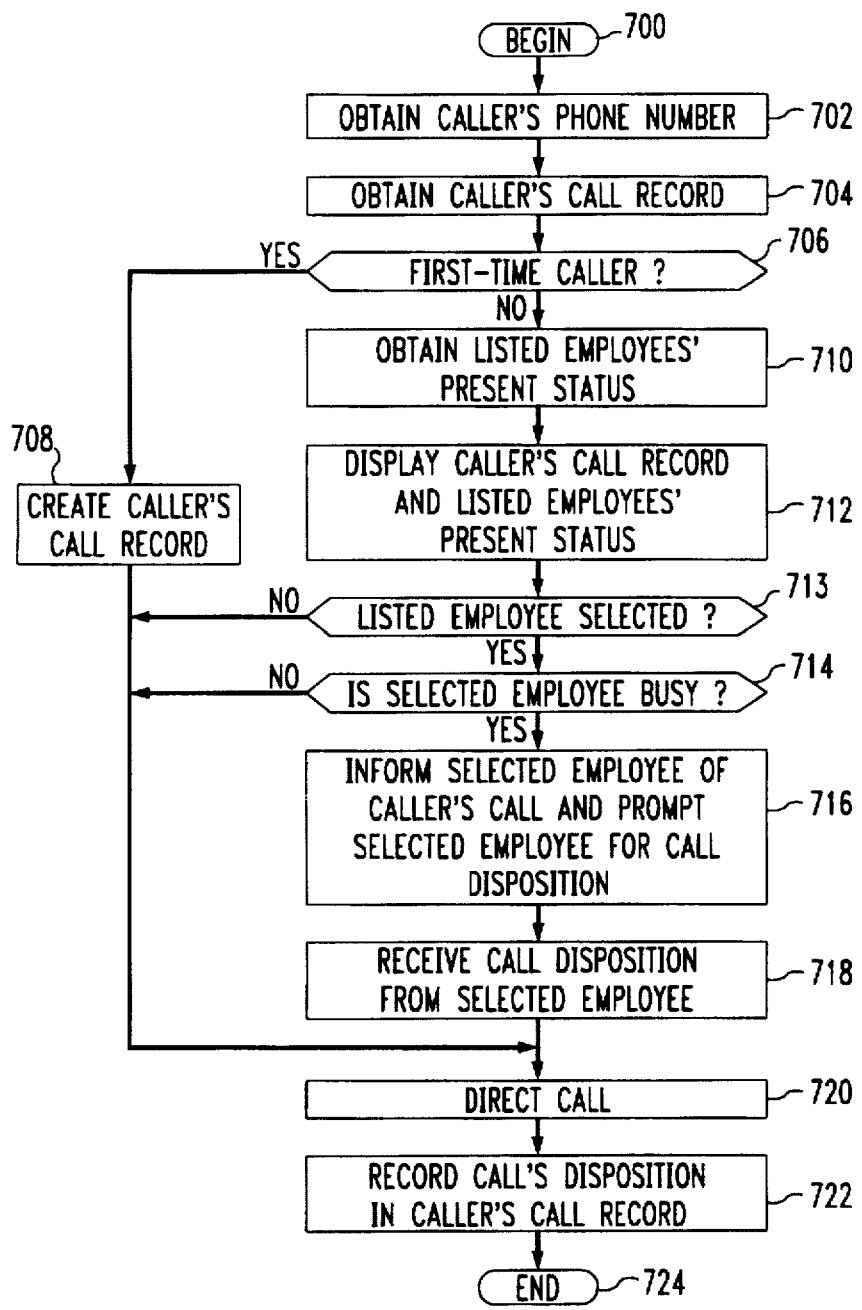
FIGS. 7–8 are a functional flow diagram of the operations of one or more workstations of the system of FIG. 6 in handling transactions with customers.

Assume that the directory function indicates to the receptionist at step 806 that Sheila Drinnon is present and not busy. With a simple function-key stroke or mouse click on Sheila's name, the receptionist causes Mr. First's call to be transferred to Sheila's phone 117 at Sheila's position 650, at step 720 of FIG. 7. CIT server 114 notes this in the call record that it had created for Mr. First at step 708, at step 722. Involvement of receptionist's workstation 118 in the call ends, at step 724.

Now assume that, a few minutes later, another caller, Ms. Second, calls and asks the receptionist to speak with Sheila. Ms. Second is not a first-time caller to ABC Company, so the determination at step 706 is negative. In response, workstation 118 obtains Ms. Second's call record from CIT server 114, at step 710. The call record indicates—either in the order of call frequency or in reverse chronological order—the employees—for example, up to a dozen employees—with whom the caller has spoken in the past. Workstation 118 also obtains at step 710 the present status of the employees who are listed in Ms. Second's call record. Workstation 118 displays Ms. Second's call record along with the present status of the employees listed therein, at step 712. If one of the employees with whom Ms. Second has spoken last or most frequently is Sheila, Sheila's name and present status are displayed by receptionist's workstation 118; if not, the receptionist obtains Sheila's present status in the same manner as was described above for Mr. First's call.

Assuming that Sheila is still busy on the call with Mr. First, the receptionist gets a visual indication from its workstation 118 that Sheila is not presently available, and the receptionist notifies Ms. Second accordingly. At the same time, Sheila may receive a visual indication that Ms. Second was calling. Ms. Second explains to the receptionist that she would be willing to speak with anyone at ABC Company who could tell her about a particular ABC product. In response, the receptionist simply enters all or a part of the product's name or some other identifier into receptionist's workstation 118. This again invokes the directory function, at step 800 of FIG. 8. Workstation 118 receives the receptionist's input, at step 802, and searches the employee directory for employees who have an indication therein of having the skill to deal with calls about the specified product, at step 804. Workstation 118 obtains from CIT server 114 the present status of the employees having the requisite skill, at step 806, and displays the employees' names and present status to the receptionist, at step 808. Again with a simple function-key stroke or mouse click, the receptionist selects employee John Doe, one of the not-busy employees having the requisite skill, at step 810, and Ms. Second's call is automatically transferred to John Doe's telephone, at step 812. This disposition of the call is noted by CIT server 114 in Ms. Second's call record, at step 722 of FIG. 7.

Assume that a while after having spoken to the employee that was selected at step 810 and hanging up, Ms. Second realizes that she forgot to ask a question. She therefore calls back, whereupon the receptionist's workstation 118 displays the name and present status of John Doe as a part of Ms. Second's call record, at step 712 of FIG. 7. When the receptionist answers Ms. Second's call, Ms. Second asks to speak to John Doe, and the receptionist selects John Doe from the displayed call record, at step 713. If John Doe is presently not busy, as determined at step 714, receptionist's workstation 118 proceeds to step 720 to transfer the call to John Doe. If John Doe is presently busy, receptionist's workstation 118 sends a message to John Doe's workstation 118 via CIT server 114 informing John Doe of the call from Ms. Second and prompting him to indicate desired call disposition, at step 716. John Doe's workstation 118 displays the message to him, at step 716, and John Doe then has the choice of (a) accepting Ms. Second's call, (b) putting Ms.

Second on hold until he is ready to accept her call, or (c) asking that Ms. Second leave a voice message. Upon receiving John Doe's selection, at step 718, his workstation 118 sends the selection to receptionist's workstation 118 through CIT server 114, and receptionist's workstation 118 displays the selection to the receptionist, also at step 718. In response, the receptionist either connects the call to John Doe by again selecting John Doe from Ms. Second's displayed call record, if John Doe has elected to accept the call despite being busy, or indicates to Ms. Second John Doe's busy status and asks whether Ms. Second would like to hold or leave a voice message for John Doe, depending upon which one of choices (b) and (c) John Doe selected at step 718. If Ms. Second agrees to hold, the receptionist's workstation 118 requests CIT server 114 to cause PBX 611 to place Ms. Second's call on hold for John Doe; if Ms. Second agrees to leave a voice message, the receptionist's workstation 118 requests CIT server 114 to cause PBX 611 to connect Ms. Second's call to adjunct 112, which provides voice-messaging services; if Ms. Second requests to be connected to another employee, the receptionist selects another employee in the manner discussed above for Ms. Second's previous call, and the receptionist's workstation 118 requests CIT server 114 to cause PBX 611 to connect the call to that other employee, all at step 720. CIT server 114 makes a note of the call's disposition in Ms. Second's call record, at step 722, and involvement of receptionist's workstation 118 in the call ends, at step 724.

Of course, various changes, modifications, and extensions to the illustrative embodiment described above will be apparent to those skilled in the art. For example, the workstation can monitor the occurrence of specific events in each transaction in addition to entry into the wrapup state, and the average time from when each event occurs until the agent is available for the next call, and feed this data back to the ACD switch for inclusion in its average waiting time calculations for call queues. The workstation thus plays a role in determining the anticipated availability of the agent for the next call. Alternatively, if workstations 118 are dumb data terminals, the functionality ascribed above in the description of the illustrative embodiment to the workstations 118 may be performed by host 116, or some other computer that is connected to LAN 100, on behalf of all of the dumb data terminals. Furthermore, an agent need not be a person, but could be an interactive voice response system. Or, the workstation may influence the appearance of the soft phone in a contextually-sensitive manner. For example, a conference button may not appear unless a call is already engaged, and/or the engaged call is of an appropriate type, such as a call from a preferred customer or only a local call. Furthermore, the workstation may assist in automating agent work states. Since the workstation is aware of the events in which the agent is engaged (by monitoring the agent's inputs and responding to the agent's requests), it is able to determine the work state of the agent. This determination is based upon a number of variables, such as the information (e.g., the particular screen of a customer's record) that is presently displayed by the workstation, the record field that the cursor is positioned upon, or the input being entered by the agent. Thus, the workstation may determine, for example, that the agent has been handling calls continuously for over 30 minutes, and respond by scheduling the agent for a 2-minute break. Or, it may determine that the agent has reached a goal of generating some predetermined amount of revenue, and reward the agent by scheduling the agent for a break. Moreover, the workstation can monitor and vary the agent's work categories. For example, if the last call was the fifth call in a row that the agent has taken for international flights, it automatically logs the agent into another "split" to ensure that the next few calls that are connected to the agent will be for domestic flights. It may even log the agent into an entirely different work function, such as a half-hour interactive training session. Such changes and modifications can be made without departing from the spirit and the scope of the invention and without diminishing its attendant advantages. It is therefore intended that such changes and modifications be covered by the following claims.

The invention claimed is:

1. A method of presenting information at a call center agent position in a context-sensitive manner, comprising the steps of:

monitoring activities at an agent position of a call center, including monitoring with whom an agent at the agent position is presently engaged in a call and what the call is about;

receiving a request for information from the agent position;

in response to the request, analyzing the request within a context of with whom the agent is presently engaged and what the call is about to determine a subset of the requested information, that excludes some of the requested information, which is most relevant to who the agent is presently engaged with and to what the call is about; and presenting at least the subset of the requested information at the agent position in response to the request, including presenting the subset of the requested information in a manner that emphasizes the subset over the rest of the requested information.

2. The method of claim 1 wherein:

the step of presenting comprises the step of displaying at least the subset of the requested information at the agent position.

3. The method of claim 1 wherein:

the step of presenting comprises the step of presenting only the subset of the requested information, without presenting the rest of the requested information, at the agent position in response to the request.

4. The method of claim 1 wherein:

the step of presenting comprises the steps of presenting all of the requested information at the agent position in response to the request; and highlighting the presented subset of the presented information over the rest of the presented information.

5. The method of claim 1 wherein:

the step of receiving a request comprises the step of receiving a request to display contents of a directory that includes a plurality of directory entries; and the step of analyzing comprises the step of analyzing the request within the context of with whom the agent is presently engaged and what the call is about, to determine a subset of the directory entries which are most relevant to who the agent is presently engaged with and to what the call is about.

6. The method of claim 5 wherein:

the plurality of directory entries include entries for call center agents;

the method further comprises the step of obtaining the present "free" or "not free" status of any agents whose entries are included in the subset of the directory entries which are most relevant to the monitored activities; and the step of presenting comprises the steps of displaying only the subset of the directory entries which are most relevant to the monitored activities, and highlighting the displayed entries of any agents whose present status is "free".

7. The method of claim 1 wherein:

the step of receiving a request comprises the step of receiving a request to display a list of a plurality of wrap up codes; and the step of analyzing comprises the step of analyzing the request within the context of the monitored activities to determine a wrap up code from the list which is most relevant to the monitored activities.

8. The method of claim 1 wherein:

the step of monitoring comprises the steps of monitoring input from an agent at the agent position; and monitoring information being displayed to the agent at the agent position.

9. The method of claim 8 wherein:

the step of monitoring comprises the step of monitoring identity of a person who is presently connected to the agent position by a telephone call.

10. The method of claim 1 further comprising the steps of:

analyzing the monitored activities to determine whether non-requested information is relevant to the monitored activities; and in response to determining that non-requested information is relevant to the monitored activities, giving an indication of the determination at the work position.

11. The method of claim 10 wherein:

the step of giving an indication comprises the step of presenting the relevant non-requested information at the agent position.

12. The method of claim 10 wherein:

the step of giving an indication comprises the step of prompting an agent at the agent position to request the relevant non-requested information.

13. The method of claim 10 wherein:

the step of giving an indication comprises the step of prompting an agent at the agent position to request the relevant non-requested information from a person who is connected to the agent position by a telephone call.

14. The method of claim 1 further comprising the steps of:

receiving information pertaining to a telephone call that is connected to subject said agent position;

analyzing the received information within the context of the monitored activities to determine whether the call should be transferred to another agent position; and in response to determining that the call should be transferred to another agent position, transferring the call to the other agent position.

15. The method of claim 14 wherein:

the step of transferring comprises the steps of in response to determining that the call should be transferred to another agent position, giving an indication of the determination at the subject agent position;

receiving a call-transfer request without indication to where the call should be transferred; and in response to the call-transfer request, transferring the call to the other agent position.

16. The method of claim 1 further comprising the steps of:

analyzing a work state of an agent at the agent position within the context of the monitored activities to determine if the work state of the agent should be changed; and in response to determining that the work state of the agent should be changed, automatically changing the work state of the agent to a different work state.

17. A method of presenting information to a call center agent in a context-sensitive manner, comprising the steps of:

monitoring an agent's input into an agent position and information being displayed to the agent at the agent position to determine with whom the agent is presently engaged in a telephone call and what the telephone call is about;

receiving a request from the agent to display, at the agent position, contents of a directory that includes a plurality of directory entries;

in response to the request, analyzing the request within a context of with whom the agent is presently engaged and what the telephone call is about, to determine a subset of the directory entries which are most relevant to who the agent is presently engaged with and to what the telephone call is about; and displaying only the subset of the directory entries at the agent position in response to the request.

18. The method of claim 17 wherein:

the step of receiving a request comprises the step of receiving a request to display a list of a plurality of wrap up codes; and the step of analyzing comprises the step of analyzing the request within the context of the monitored activities to determine a wrap up code from the list which is most relevant to the monitored activities.

19. A method of presenting address directory information to a party to a communication in a context-sensitive manner, comprising the steps of:

determining with whom the party to the communication is presently engaged in the communication;

analyzing by machine contents of an address directory that includes a plurality of address directory entries to determine a subset of the address directory entries which are most relevant to who the party to the communication is presently engaged with and which excludes some of the address directory entries; and presenting the subset of the address directory entries to the party to the communication.

20. The method of claim 19 further comprising the step of determining present status of entities to whom correspond the address directory entries that are included in the subset of the address directory entries; and wherein the step of presenting comprises the step of presenting, to the party to the communication, the subset of the address directory entries along with the present status of the corresponding entities.

21. The method of claim 19 wherein:

the step of analyzing comprises the step of analyzing by machine a previous-communications history of who the party to the communication is presently engaged with, to determine the subset of the address directory entries.

22. The method of claim 21 wherein:

the subset comprises the address directory entries of entities whom the previous-communications history identifies as having been parties to the previous communications.

23. An apparatus for presenting information at a call center agent position in a context-sensitive manner, comprising:

means for monitoring activities at an agent position of a call center, including monitoring with whom an agent at the agent position is presently engaged in a call and what the call is about;

a processor connected to the monitoring means and responsive to receiving a request for information from the agent position, for analyzing the request within a context of with whom the agent is presently engaged and what the call is about to determine a subset of the requested information, that excludes some of the requested information, which is most relevant to who the agent is presently engaged with and to what the call is about; and means connected to the processor for presenting at least the subset of the requested information at the agent position in response to the request, including presenting the subset of the requested information in a manner that emphasizes the subset over the rest of the requested information.

24. The apparatus of claim 23 wherein:

the means for presenting comprise means for displaying at least the subset of the requested information at the agent position.

25. The apparatus of claim 23 wherein:

the presenting means comprise means for presenting only the subset of the requested information, without presenting the rest of the requested information, at the agent position in response to the request.

26. The apparatus of claim 23 wherein:

the presenting means comprise means for presenting all of the requested information at the agent position in response to the request and highlighting the presented subset of the presented information over the rest of the presented information.

27. The apparatus of claim 23 wherein:

the analyzing means comprise means responsive to receipt of a request to display contents of a directory that includes a plurality of directory entries, for analyzing the request within the context of with whom the agent is presently engaged and what the call is about to determine a subset of the directory entries which are most relevant to who the agent is presently engaged with and to what the call is about.

28. The apparatus of claim 27 wherein:

the plurality of directory entries include entries for call center agents;

the apparatus further comprises means for obtaining the present "free" or "not free" status of any agents whose entries are included in the subset of the directory entries which are most relevant to the monitored activities; and the presenting means comprise means for displaying only the subset of the directory entries which are most relevant to the monitored activities and highlighting the displayed entries of any agents whose present status is "free".

29. The apparatus of claim 23 wherein:

the analyzing means comprise means responsive to receipt of a request to display a list of a plurality of wrap up codes, for analyzing the request within the context of the monitored activities to determine a wrap up code from the list which is most relevant to the monitored activities.

30. The apparatus of claim 23 wherein:

the monitoring means comprise means for monitoring input from an agent at the agent position; and means for monitoring information being displayed to the agent at the agent position.

31. The apparatus of claim 30 wherein:

the monitoring means monitor identity of a person who is presently connected to the agent position by a telephone call.

32. The apparatus of claim 23 wherein:

the analyzing means include means for analyzing the monitored activities to determine whether non-requested information is relevant to the monitored activities; and the presenting means comprise means responsive to determining that non-requested information is relevant to the monitored activities, for giving an indication of the determination at the work position.

33. The apparatus of claim 32 wherein:

the means for giving an indication comprise means for presenting the relevant non-requested information at the agent position.

34. The apparatus of claim 32 wherein:

the means for giving an indication comprise means for prompting an agent at the agent position to request the relevant non-requested information.

35. The apparatus of claim 32 wherein:

the means for giving an indication comprise means for prompting an agent at the agent position to request the relevant non-requested information from a person who is connected to the agent position by a telephone call.

36. The apparatus of claim 23 further comprising:

means for receiving information pertaining to a telephone call that is connected to subject said agent position; wherein the analyzing means include means connected to the receiving means, for analyzing the received information within the context of the monitored activities to determine whether the call should be transferred to another agent position; and the apparatus further comprising means responsive to a determination that the call should be transferred to another agent position, for transferring the call to the other agent position.

37. The apparatus of claim 36 wherein:

the presenting means comprise means responsive to the determination that the call should be transferred to another agent position, for giving an indication of the determination at the subject agent position; and the transferring means comprise means responsive to receipt of a call-transfer request without indication to where the call should be transferred, for transferring the call to the other agent position.

38. The apparatus of claim 23 wherein:

the analyzing means comprise means for analyzing a work state of an agent at the agent position within the context of the monitored activities to determine if the work state of the agent should be changed, and in response to determining that the work state of the agent should be changed for automatically changing the work state of the agent to a different work state.

39. An apparatus for presenting information to a call center agent in a context-sensitive manner, comprising:

means for monitoring an agent's input into an agent position and information being displayed to the agent at the agent position to determine with whom the agent is presently engaged in a telephone call and what the telephone call is about;

a processor connected to the monitoring means and responsive to receipt of a request from the agent to display at the agent position contents of a directory that includes a plurality of directory entries, for analyzing the request within a context of with whom the agent is presently engaged and what the telephone call is about, to determine a subset of the directory entries which are most relevant to who the agent is presently engaged with and to what the telephone call is about; and means connected to the processor, for displaying only the subset of the directory entries at the agent position in response to the request.

40. The apparatus of claim 39 wherein:

the analyzing means comprise means responsive to receipt of a request to display a list of a plurality of wrap up codes, for analyzing the request within the context of the monitored activities to determine a wrap up code from the list which is most relevant to the monitored activities.

41. An apparatus for presenting address directory information to a party to a communication in a context-sensitive manner, comprising:

means for determining with whom the party to the communication is presently engaged in the communication;

means for analyzing contents of an address directory that includes a plurality of address directory entries to determine a subset of the address directory entries which are most relevant to who the party to the communication is presently engaged with and which excludes some of the address directory entries; and presenting the subset of the address directory entries to the party to the communication.

42. The apparatus of claim 41 further comprising means for determining present status of entities to whom correspond the address directory entries that are included in the subset of the address directory entries; and wherein the presenting means comprise means for presenting, to the party to the communication, the subset of the address directory entries along with the present status of the corresponding entities.

43. The apparatus of claim 41 wherein:

the analyzing means include means for analyzing a previous-communications history of who the party to the communication is presently engaged with, to determine the subset of the address directory entries.

44. The apparatus of claim 43 wherein:

the subset comprises the address directory entries of entities whom the previous-communications history identifies as having been parties to the previous communications.

* * * * *